(12) United States Patent
Burgmeier et al.

(10) Patent No.: US 9,613,140 B2
(45) Date of Patent: *Apr. 4, 2017

(54) REAL-TIME AUDIO DICTIONARY UPDATING SYSTEM

(71) Applicant: International Business Machines Corporation, Armonk, NY (US)

(72) Inventors: Amanda Y. Burgmeier, Austin, TX (US); Praveen P. Hirsave, Round Rock, TX (US); Su Liu, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/279,743

(22) Filed: May 16, 2014

(65) Prior Publication Data

US 2015/0331848 A1    Nov. 19, 2015

(51) Int. Cl.
*G10L 13/08* (2013.01)
*G06F 17/30* (2006.01)
(Continued)

(52) U.S. Cl.
CPC .......... *G06F 17/30752* (2013.01); *G06F 9/44* (2013.01); *G06F 9/4448* (2013.01);
(Continued)

(58) Field of Classification Search
CPC ................................ G10L 15/06; G10L 13/08
(Continued)

(56) References Cited

U.S. PATENT DOCUMENTS 5,787,231 A * 7/1998 Johnson ................ G10L 13/033
704/260
5,933,804 A * 8/1999 Huang .................. G10L 15/063
704/244
(Continued)

OTHER PUBLICATIONS

Wikipedia, "Four tones (Chinese)", http://en.wikipedia.org/wiki/Four_tones_%28Chinese%29, Four tones (Chinese)—Wikipedia, the free encyclopedia, Accessed on Mar. 19, 2014, pp. 1-3.
(Continued)

*Primary Examiner* — David Hudspeth
*Assistant Examiner* — Shreyans Patel
(74) *Attorney, Agent, or Firm* — Robert C. Bunker

(57) ABSTRACT

According to one exemplary embodiment, a method for updating an audio dictionary is provided. The method may include receiving at least one audio file within a plurality of audio files associated with a term. The method may also include receiving at least one user evaluation associated with the at least one audio file, the at least one user evaluation being based on a correlation between nationality characteristics associated with the received at least one audio file and the at least one user evaluation. The method may further include assigning a ranking to the at least one audio file within the plurality of audio files based on the received at least one user evaluation associated with the at least one audio file, wherein the assigned ranking is from a lowest ranking to a highest ranking. The method may also include adding the assigned highest ranking audio file into the audio dictionary.

12 Claims, 5 Drawing Sheets

(51) Int. Cl.
*G06F 9/44* (2006.01)
*G06F 17/27* (2006.01)
*G06F 17/28* (2006.01)
*G10L 15/06* (2013.01)

(52) U.S. Cl.
CPC ........ *G06F 17/2735* (2013.01); *G06F 17/289* (2013.01); *G06F 17/3053* (2013.01); *G06F 17/30106* (2013.01); *G06F 17/30297* (2013.01); *G10L 15/063* (2013.01)

(58) Field of Classification Search
USPC .................................................. 704/244, 260
See application file for complete search history.

(56) References Cited

U.S. PATENT DOCUMENTS

| | | | |
|---|---|---|---|
| 8,447,603 B2 | 5/2013 | Hoory et al. | |
| 2003/0036903 A1* | 2/2003 | Konopka | G10L 15/065 704/249 |
| 2006/0057545 A1* | 3/2006 | Mozer | G09B 5/06 434/156 |
| 2008/0082316 A1 | 4/2008 | Tsui et al. | |
| 2009/0119105 A1* | 5/2009 | Kim | G10L 15/07 704/244 |
| 2010/0185435 A1* | 7/2010 | Deshmukh | G09B 19/04 704/8 |
| 2013/0179170 A1* | 7/2013 | Cath | G10L 13/08 704/260 |

OTHER PUBLICATIONS

IBM, "Real-Time Translation Service", http://rtts.ihe.ibm.com/rtts/login.jsp, RTTS Interface, Accessed on Mar. 19, 2014.
IBM, "n.-Fluent Translation", Real-time Translation Services & Crowdsourcing of language data, https://appstore.tap.ibm.com/app/98691/nfluent-translation, AppStore—n.Fluent Translation, pp. 1-2, Accessed on Mar. 19, 2014.
IBM: List of IBM Patents or Patent Applications Treated as Related (Appendix P).
U.S. Appl. No. 14/511,544, filed Oct. 10, 2014, entitled: "Real-Time Audio Dictionary Updating System".

\* cited by examiner

REAL-TIME AUDIO DICTIONARY UPDATING SYSTEM

BACKGROUND

The present invention relates generally to the field of computing, and more particularly to voice recognition software.

The popularity and sophistication of voice recognition software has risen dramatically as users find that interacting with electronic devices such as smartphones by simply speaking may be more convenient and intuitive than traditional input methods.

SUMMARY

According to one exemplary embodiment, a method for updating an audio dictionary is provided. The method may include receiving at least one audio file within a plurality of audio files associated with a term. The method may also include receiving at least one user evaluation associated with the at least one audio file, the at least one user evaluation being based on a correlation between nationality characteristics associated with the received at least one audio file and the at least one user evaluation. The method may further include assigning a ranking to the at least one audio file within the plurality of audio files based on the received at least one user evaluation associated with the at least one audio file, wherein the assigned ranking is from a lowest ranking to a highest ranking. The method may also include adding the assigned highest ranking audio file into the audio dictionary.

According to another exemplary embodiment, a computer system for updating an audio dictionary is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving at least one audio file within a plurality of audio files associated with a term. The method may also include receiving at least one user evaluation associated with the at least one audio file, the at least one user evaluation being based on a correlation between nationality characteristics associated with the received at least one audio file and the at least one user evaluation. The method may further include assigning a ranking to the at least one audio file within the plurality of audio files based on the received at least one user evaluation associated with the at least one audio file, wherein the assigned ranking is from a lowest ranking to a highest ranking. The method may also include adding the assigned highest ranking audio file into the audio dictionary.

According to yet another exemplary embodiment, a computer program product for updating an audio dictionary is provided. The computer program product may include one or more computer-readable storage devices and program instructions stored on at least one of the one or more tangible storage devices, the program instructions executable by a processor. The computer program product may include program instructions to receive at least one audio file within a plurality of audio files associated with a term. The computer program product may also include program instructions to receive at least one user evaluation associated with the at least one audio file, the at least one user evaluation being based on a correlation between nationality characteristics associated with the received at least one audio file and the at least one user evaluation. The computer program product may further include program instructions to assign a ranking to the at least one audio file within the plurality of audio files based on the received at least one user evaluation associated with the at least one audio file, wherein the assigned ranking is from a lowest ranking to a highest ranking. The computer program product may also include program instructions to add the assigned highest ranking audio file into the audio dictionary.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
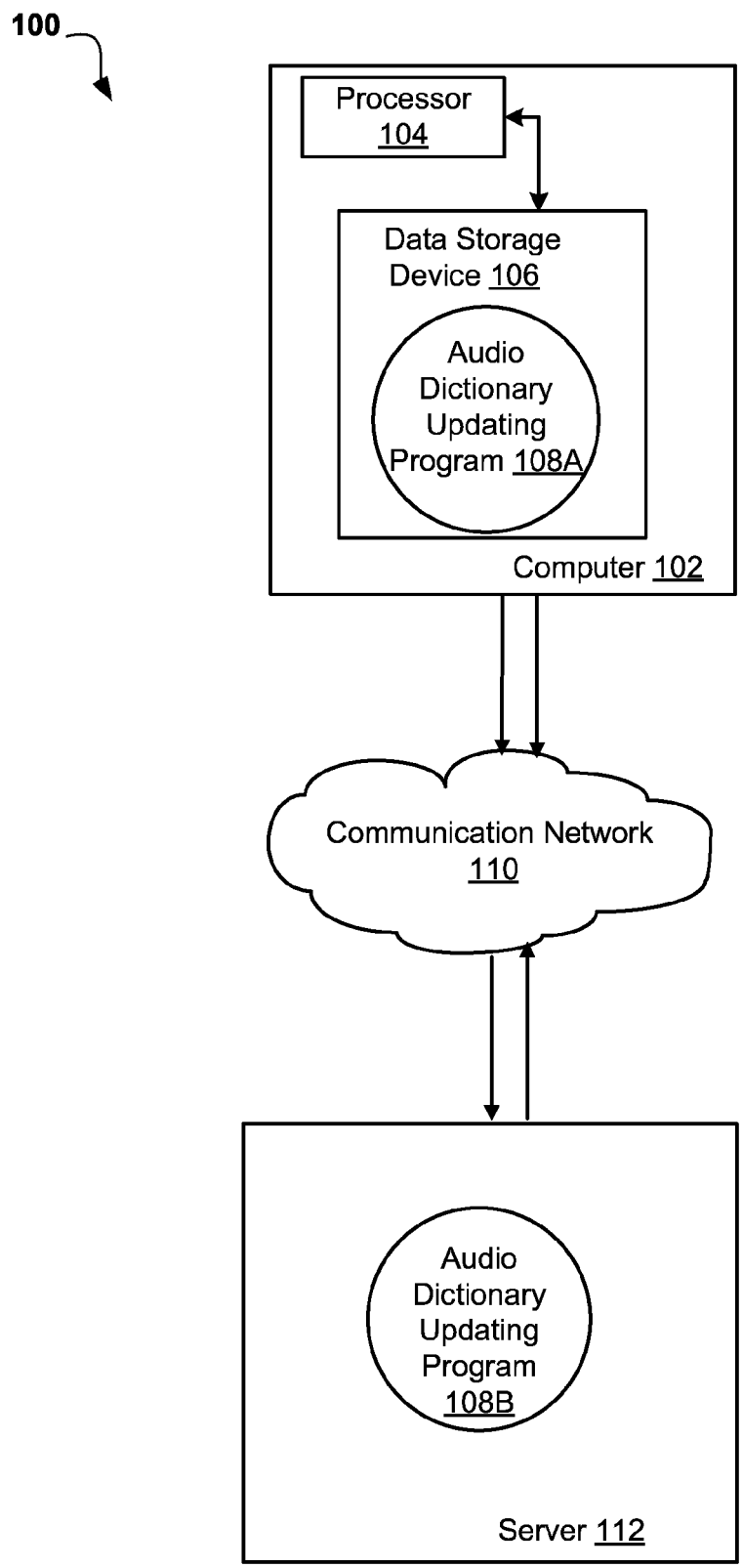
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for an audio dictionary updating system.

As previously described, voice recognition software has become increasingly popular as smartphones and other portable electronic devices become a standard accessory for people. Voice recognition is often employed by voice assistant service software to allow users to verbally interact with their smartphones as an alternative input method. Users may find that speaking commands to their smartphone may be more convenient than traditional methods such as typing on a touchscreen. In situations such as driving, tapping on the user's smartphone touchscreen may be dangerous and against the law whereas verbal interaction with a smartphone may be a safer alternative.

While voice assistance services have become more sophisticated, voice assistant service software may still have difficulty accurately recognizing varied human accents when speaking. Voice assistant service software also may not accurately recognize national terms (e.g., trademarks, geographic location names, etc.) and names of persons derived from different languages. For example, a name originating from China may be pronounced differently in English than in Chinese. Thus, a user pronouncing the Chinese name in the original Chinese form, may cause voice assistant service software trained to recognize the name in English to fail to recognize the user's vocalization of the name. Likewise, voice assistant service software may also fail to recognize a Chinese user speaking a term in English with a Chinese accent. As such, it may be advantageous, among other things, to implement a method for real-time audio dictionary updating that allows users to train voice assistance services to accurately recognize the user's speech despite the user's accent or the user's pronunciation of terms, and correctly associate the user's speech with the user's intended terms.

Referring now to FIG. 1, an exemplary networked computer environment 100 in accordance with one embodiment is depicted. The networked computer environment 100 may include a computer 102 with a processor 104 and a data storage device 106 that is enabled to run a real-time audio dictionary updating program 108A. The networked computer environment 100 may also include a server 112 that is enabled to run a real-time audio dictionary updating program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a real-time audio dictionary updating program 108A and 108B may run on the client computer 102 or on the server computer 112. The real-time audio dictionary updating program 108A and 108B may be used for updating an audio dictionary in real-time based on user submitted audio files and user evaluations of the submitted audio files. The real-time audio dictionary updating program 108A and 108B is explained in further detail below with respect to FIG. 2.

Figure 2:
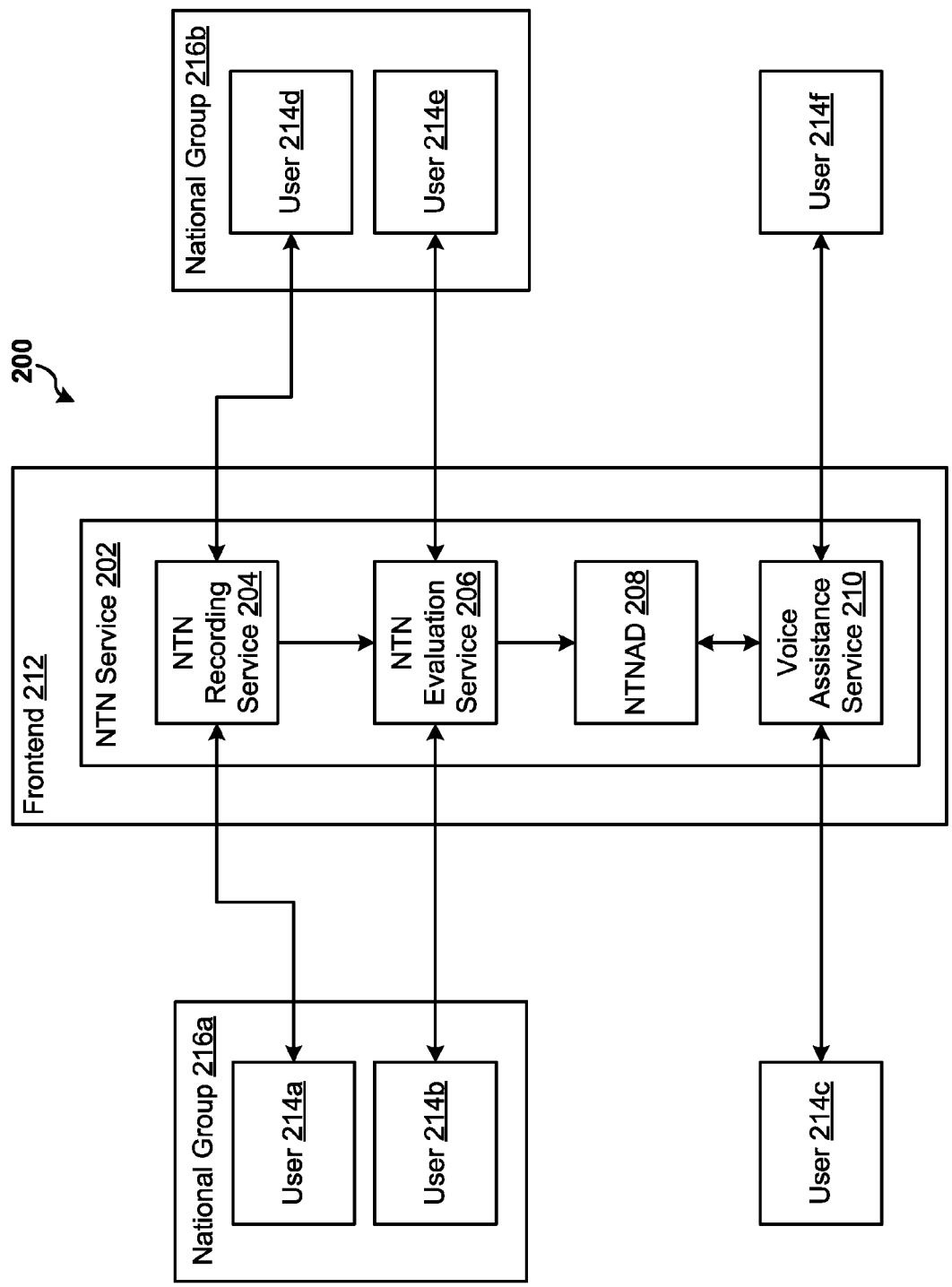
FIG. 2 is a block diagram of the audio dictionary updating system according to at least one embodiment.

FIG. 2, a block diagram of a real-time audio dictionary updating system 200 corresponding to the real-time audio dictionary updating program 108A and 108B (FIG. 1) according to at least one embodiment is depicted. The real-time audio dictionary updating system 200 may include a national term and name (NTN) service 202 comprising an NTN recording service 204, an NTN evaluation service 206, an NTN audio dictionary (NTNAD) 208, and a voice assistance service 210.

The NTN service 202 may also utilize a frontend 212 to facilitate user 214a-f interaction with the NTN service 202 (i.e., backend). According to one implementation, the frontend 212 may be a web-based graphical user interface (GUI). According to one other implementation, the frontend 212 may be an application having a GUI that is run on a smartphone or tablet. The frontend 212 may be implemented with a user account system that may include a password-controlled user login and user profile. The user profile may store information related to the user's 214a-f nationality, education, occupation, and links to external user 214a-f social media accounts.

Users 214a-f using the real-time audio dictionary updating system 200 may have a national group 216a-b characteristic (i.e., nationality characteristic). According to at least one implementation, the national group 216a-b may correspond to a nationality (e.g., Chinese). The users 214a-f may be identified as a national group 216a-b to increase the accuracy and consistency of the real-time audio dictionary updating system 200 by restricting the recording and evaluation of audio files to users 214a-f of the same national group 216a-b. For example, a user 214a of a national group (e.g., 216a, Chinese) may wish to update an NTNAD to recognize a pronunciation for a name (e.g., Xiaoyun, or as originally denoted by the Chinese characters 晓 芸 of the same national group (e.g., 216a, Chinese) by submitting an audio file recording of the user 214a vocalizing the name (e.g., Xiaoyun). Users 214a-f of the same national group 216a-b may be able to more competently evaluate the accuracy of audio files submitted for proposed NTNAD updates corresponding to terms of the same national group 216a-b. Thus, the real-time audio dictionary updating system 200 may, according to at least one implementation, only accept evaluations from users 214a-f having the same national group (e.g., 216a) characteristic as the user (e.g., 214a) who submitted the audio file.

The NTN recording service 204 may be a part of the NTN service 202 that prepares audio file recordings for evaluation. According to at least one implementation, the NTN recording service 204 may utilize one or more microphones, one or more speakers, and one or more other input devices (e.g., touch screens, mice, keyboards, etc.) through the frontend 212 to create an audio file recording of the user 214a-f vocalizing a term. According to at least one other implementation, the NTN recording service 204 may receive an audio file that was recorded by some other program. The NTN recording service 204 is explained in further detail below with reference to FIG. 3.

The NTN evaluation service 206 may be a part of the NTN service 202 that receives user evaluations for the audio files provided by the NTN recording service 204. According to at least one implementation, the NTN evaluation service 206 may utilize the frontend 212 to play one or more audio files for users 212a-f and collect one or more user evaluations corresponding to the played one or more audio files. The NTN evaluation service 206 is explained in further detail below with respect to FIG. 4.

The NTNAD 208 may correspond to a data repository, such as a database, delineating the relationship between audio inputs (e.g., a user's 214a-f vocalization) and terms (e.g., words or phrases). The NTNAD 208 may be updated by the NTN evaluation service 206. Additionally, the NTNAD 208 may be utilized by the voice assistance service 210 to lookup what term corresponds to user 214a-f audio input.

Voice assistance service 210 may be a part of the NTN service 202 that may receive user (e.g., 214c) audio input and may respond to the received audio input. For example, a user (e.g., 214c) may vocalize an audio command to a smartphone to dial the phone number of a person in the user's (e.g., 214c) contact list. The voice assistance service 210 may respond to the audio command by producing an audio output confirming the audio command and then dial the phone number corresponding to the person in the user's (e.g., 214c) contact list that the user (e.g., 214c) commanded the voice assistance service 210 to call. In responding to the user's (e.g., 214c) audio command, the voice assistance service 210 may access an audio dictionary, such as the NTNAD 208, to determine what action the user (e.g., 214c) intends the voice assistance service 210 to perform.

Figure 3:
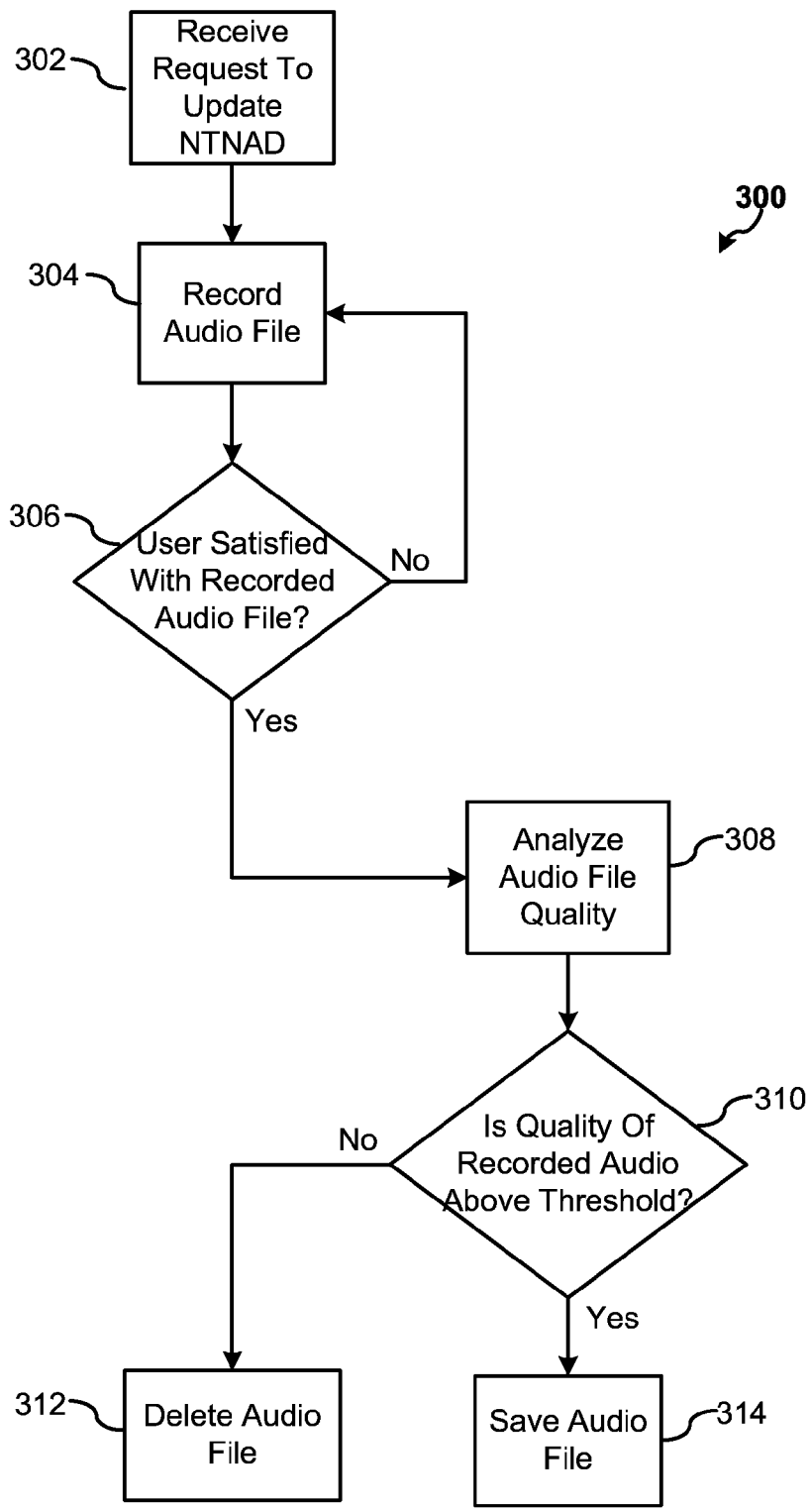
FIG. 3 is an operational flow chart illustrating a process for a national term and name recording service according to at least one embodiment.

Referring now to FIG. 3, an operational flow chart illustrating the exemplary recording process 300 by the NTN recording service 204 (FIG. 2) according to at least one embodiment is depicted. At 302, the recording process 300 may receive a request that may have been initiated by a user (e.g., 214a: FIG. 2) to update a term in the NTNAD 208 (FIG. 2). For example, this request may be generated from a web-based frontend 212 (FIG. 2) to the NTN recording service 204 (FIG. 2). The user (e.g., 214a: FIG. 2) may identify a term (e.g., Xiaoyun) that the voice recognition software may not be recognizing correctly (e.g., the voice recognition software may not associate the user's vocalization of the term with the intended term). The user (e.g., 214a: FIG. 2) may then indicate a desire to update the NTNAD 208 (FIG. 2) to correctly recognize the user's (e.g., 214a: FIG. 2) vocalization of the term (e.g., Xiaoyun).

Next, at 304, the recording process 300 may prompt the user (e.g., 214a: FIG. 2) to record and save an audio file capturing the user's (e.g., 214a: FIG. 2) vocalization of the term. Then, at 306, the user (e.g., 214a: FIG. 2) may be given the opportunity to review the recorded audio file and indicate whether or not the recording is satisfactory. If the user (e.g., 214a: FIG. 2) is not satisfied with the recorded audio file (e.g., the user's voice was not clearly recorded or the recording stopped before the user was finished vocalizing the term), the user (e.g., 214a: FIG. 2) may indicate that the recording was unsatisfactory (e.g., by clicking a button on a GUI frontend 210: FIG. 2) and then the recording process may return to 304 to prompt the user (e.g., 214a: FIG. 2) to rerecord the user's (e.g., 214a: FIG. 2) vocalization of the term.

However, if the user (e.g., 214a: FIG. 2) indicates (e.g., via the frontend 210: FIG. 2) at 306 that the recorded audio file is satisfactory, the recording process 300, at 308, may analyze the audio quality of the recorded audio file. For example, the recorded audio file may be analyzed to check for the presence of frequencies outside of the typical range of a human voice in the recorded audio file that may indicate background noise.

At 310, the result of the analysis performed at 308 may be compared against a predetermined threshold. For example, a threshold may be set to reject recorded audio files that may have frequencies outside of the typical range of a human voice present for more than 5% of the total audio file. If the recorded audio file does not exceed the quality threshold, the recorded audio file may be deleted at 312.

However, if at 310, the recorded audio file's quality is determined to have exceeded the threshold (e.g., the recorded audio file does not have frequencies outside of the typical range of a human voice present for more than 5% of the total audio file), the recorded audio file may be saved for evaluation by users 214a-f (FIG. 2) at 314. According to at least one implementation, at 314, the recording process 300 may save the recoded audio file for evaluation to a storage device such as a hard drive containing one or more recorded audio files for use by the NTN evaluation service 206 (FIG. 2). Additionally, the recording process 300 may record the national group 216a-b (FIG. 2) characteristic of the user (e.g., 214a: FIG. 2) that recorded the audio file. The user's (e.g., 214a: FIG. 2) national group 216a-b (FIG. 2) may be determined, for example, by accessing the user's profile associated with the frontend 212 (FIG. 2) and reading the user's (e.g., 214a: FIG. 2) nationality or by accessing a linked social media profile that may list the user's (e.g., 214a: FIG. 2) nationality. According to another implementation, the user's (e.g., 214a: FIG. 2) national group 216a-b (FIG. 2) may also be determined from users (e.g., 214a: FIG. 2) accessing a web-based frontend 212 (FIG. 2) by reading the user's (e.g., 214a: FIG. 2) IP address identifying the user's (e.g., 214a: FIG. 2) geographic location or by reading the default language used by the user's (e.g., 214a: FIG. 2) web browser.

Figure 4:
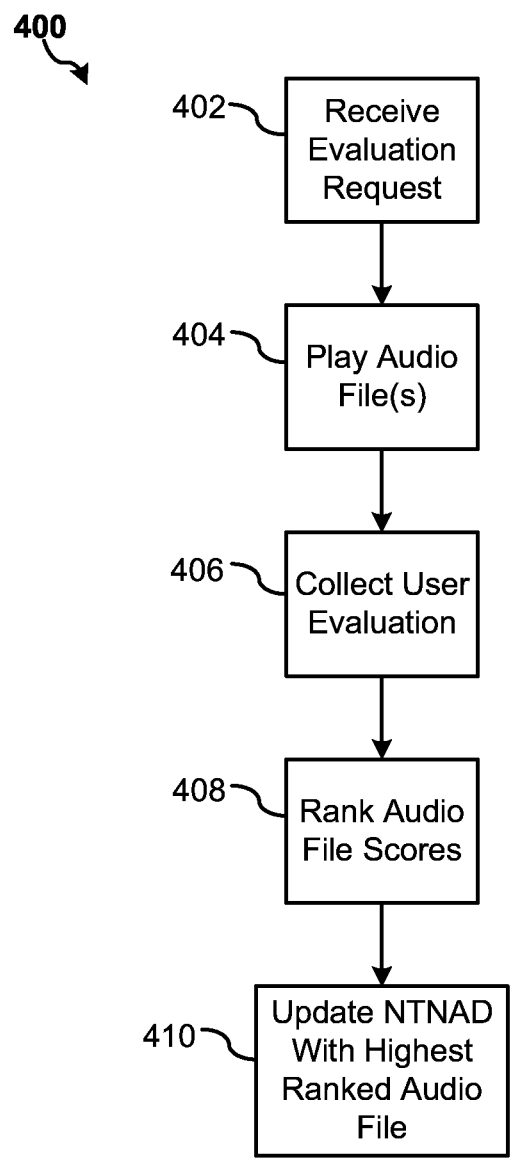
FIG. 4 is an operational flow chart illustrating a process for a national term and name evaluation service according to at least one embodiment.

FIG. 4 illustrates an exemplary evaluation process 400 of the NTN evaluation service 206 (FIG. 2) according to at least one implementation. The evaluation process 400 may begin at 402 by receiving a user 214a-f (FIG. 2) initiated request to evaluate one or more audio files added by users 214a-f (FIG. 2) through the recording process 300 (FIG. 3). According to at least one implementation, the evaluation process 400 may only accept requests for evaluation from users 214a-f (FIG. 2) who are from the same national group 216a-b (FIG. 2) as the user 214a-f (FIG. 2) who recorded the audio file. According to at least one other implementation, the evaluation process 400 may bias evaluations received from evaluating users (e.g., 214b: FIG. 2) belonging to nation groups 216a-b (FIG. 2) other than the national group 216a-b (FIG. 2) of the user (e.g., 214a: FIG. 2) who submitted the audio file to be given little weight or to be ignored. The evaluation process 400 may determine what national group 216a-b (FIG. 2) the evaluating user (e.g., 214b: FIG. 2) may belong to by using the methods discussed previously with respect to the recording process 300 (FIG. 3) at 314 (FIG. 3).

For example, a user (e.g., 214b: FIG. 2) associated with national group 216a (FIG. 2) may initiate, via a web-based GUI frontend 212 (FIG. 2) to the NTN evaluation service 206 (FIG. 2), a request to evaluate one or more audio files vocalizing a term (e.g., Xiaoyun) associated with a national group (e.g., 216a: FIG. 2) that may have been recorded through the NTN recording service 204 (FIG. 2). The evaluation process 400 may receive the request generated by the frontend 212 (FIG. 2) to evaluate the term (e.g., Xiaoyun) and then may check if the evaluating user (e.g., 214b: FIG. 2) is associated with the same national group (e.g., 216a: FIG. 2) as the one or more recorded audio files by reading the IP address of the evaluating user (e.g., 214b: FIG. 2) accessing the web-based GUI frontend 212 (FIG. 2).

At 404, the evaluation process 400 may play one or more audio files corresponding to a term (e.g., Xiaoyun) for evaluation by the evaluating user (e.g., 214b: FIG. 2). Then at 406, the evaluating user (e.g., 214b: FIG. 2) may be prompted to evaluate the one or more audio files the evaluation process 400 may have played for the evaluating user (e.g., 214b: FIG. 2). According to at least one implementation, the prompt may present the evaluating user (e.g., 214b: FIG. 2) with a choice of scoring each of the one or more audio files on a scale of one to ten where a score of ten indicates that the audio file depicts the term most accurately, and where a score of one indicates that the audio file depicts the term least accurately.

Next, at 408, the audio file user evaluation scores may be ranked to identify the highest scored audio file associated with the term being evaluated. According to at least one implementation, audio file scores may be ranked based on a combination of the user evaluation score (e.g., from a scale of one to ten) and the number of evaluating users (e.g., 214b: FIG. 2) that have evaluated the audio file (e.g., audio files that have received few evaluations may be biased to rank lower or be ignored). Additionally, the audio file score ranking may utilize the background information (e.g., occupation, education, etc.) of the evaluating users (e.g., 214b: FIG. 2) that may indicate the evaluating user's (e.g., 214b: FIG. 2) linguistic skills or abilities to alter the weight of each user's (e.g., 214b: FIG. 2) evaluations differently. The evaluating user's (e.g., 214b: FIG. 2) background information may be derived from searching for relevant data in social media profiles associated with the evaluating user (e.g., 214b: FIG. 2) or from information that the evaluating user (e.g., 214b: FIG. 2) has expressly provided. For example, if a user's (e.g., 214b: FIG. 2) social media profile linked to the NTN evaluation service 206 (FIG. 2) indicates that the evaluating user (e.g., 214b: FIG. 2) has a degree in linguistics or other linguistic skills or abilities (e.g., language teacher, writer, etc.), that user's (e.g., 214b: FIG. 2) evaluation may be given greater weight when ranking scores.

At 410, the evaluation process 400 may update the NTNAD 208 (FIG. 2) with the audio file having the highest ranked score. According to at least one implementation, the NTNAD 208 (FIG. 2) may utilize the highest ranked audio file to train the voice assistance service 210 (FIG. 2) to recognize users (e.g., 214c: FIG. 2) vocalizing the term (e.g., Xiaoyun) consistent with the highest ranked audio file and properly associate the user's (e.g., 214c: FIG. 2) audio input with the intended term (e.g., Xiaoyun). Additionally, the voice assistance service 210 (FIG. 2) may train the artificial voice audio output to reproduce the term (e.g., Xiaoyun) consistent with the highest ranked audio file's vocalization of the term (e.g., Xiaoyun). After any NTNAD 208 (FIG. 2) updates, the updated NTNAD 208 (FIG. 2) may be sent out to update individual program instances such as on a user's 214a-f (FIG. 2) smartphone.

Figure 5:
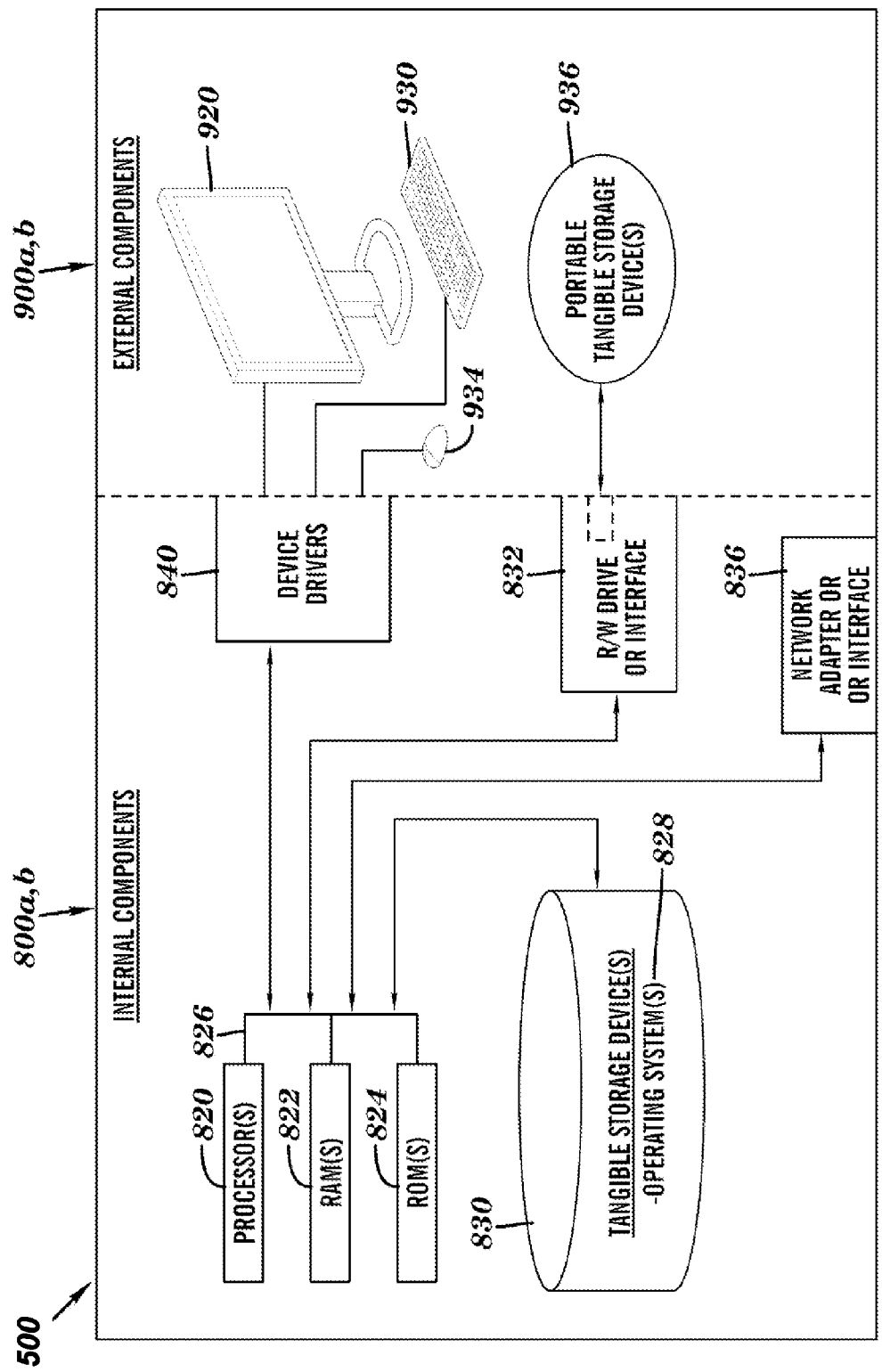
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 5. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a real-time audio dictionary updating program 108A and 108B (FIG. 1), may be stored on one or more computer-readable tangible storage devices 830 for execution by one or more processors 820 via one or more RAMs 822 (which typically include cache memory). Real-time audio dictionary updating program 108A and 108B (FIG. 1) is described above by recording process 300 (FIG. 3) and evaluation process 400 (FIG. 4). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The real-time audio dictionary updating program 108A and 108B (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The real-time audio dictionary updating program 108A (FIG. 1) in client computer 102 (FIG. 1) and the real-time audio dictionary updating program 108B (FIG. 1) in network server computer 112 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the real-time audio dictionary updating program 108A (FIG. 1) in client computer 102 (FIG. 1) and the real-time audio dictionary updating program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, microphones, speakers, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for updating an audio dictionary stored in a database, the method comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving at least one audio file within a plurality of audio files associated with a term from a first computer via a communications network, wherein the received at least one audio file includes a recording capturing a vocalization of the term spoken by a vocalizing user;
   playing the received at least one audio file for review by the vocalizing user;
   presenting a confirmation button to the vocalizing user through a graphical user interface in response to playing the received at least one audio file for review, wherein the vocalizing user indicates the received at least one audio file is satisfactory by activating the confirmation button;
   receiving a vocalizing user satisfaction indicator in response to the vocalizing user activating the confirmation button;
   determining if at least one audio quality characteristic of the received at least one audio file exceeds an audio quality threshold in response to receiving the vocalizing user satisfaction indicator;
   playing the received at least one audio file for evaluation by an evaluating user based on determining that the at least one audio quality characteristic of the received at least one audio file for audio exceeds an audio quality threshold;
   receiving, in response to playing the received at least one audio file, at least one user evaluation generated by the evaluating user from a second computer via the communications network associated with the at least one audio file, the at least one user evaluation being based on a correlation between nationality characteristics associated with the received at least one audio file and the at least one user evaluation, wherein the received at least one user evaluation includes at least one of a user evaluation score, at least one linguistic skill of the evaluating user, and a plurality of background information of the evaluating user;
   assigning a ranking to the at least one audio file within the plurality of audio files based on the received at least one user evaluation associated with the at least one audio file, wherein the assigned ranking is from a lowest ranking to a highest ranking, and wherein the assigned ranking is weighted based on at least one of a number of evaluating users, the user evaluation score, the at least one linguistic skill, and the plurality of background information;
   adding the assigned highest ranking audio file into the audio dictionary; and
   training a voice assistance service to recognize an audio input from a user matching the added assigned highest ranking audio file in the audio dictionary.

2. The computer system of claim 1, wherein the at least one audio file associated with the term includes a first nationality characteristic and the at least one user evaluation includes a second nationality characteristic, the assigned ranking being reduced based on the first and the second nationality characteristic being different.

3. The computer system of claim 2, wherein the receiving the at least one user evaluation is based on the first nationality characteristic and the second nationality characteristic, the assigned ranking being increased based on the first and the second nationality characteristic being the same.

4. The computer system of claim 1, wherein the adding the assigned highest ranking audio file in the audio dictionary comprises training the audio dictionary to associate an audio input with the added highest ranking audio file.

5. The computer system of claim 1, wherein the adding the assigned highest ranking audio file in the audio dictionary comprises training the audio dictionary to associate an audio output with the highest ranking audio file.

6. The computer system of claim 1, wherein the assigning the ranking to the at least one audio file comprises determining a total number of user evaluations received corresponding to the at least one audio file and selecting the at least one audio file for adding to the audio dictionary based on at least one of the total number of user evaluations exceeding a threshold value associated with the assigned ranking.

7. The computer system of claim 1, wherein the assigning the ranking to the at least one audio file comprises assessing user information associated with a user submitting the at least one user evaluation.

8. A computer program product for updating an audio dictionary stored in a database, comprising:
   one or more non-transitory computer-readable storage medium and program instructions stored on at least one of the one or more tangible storage medium, the program instructions executable by a processor, the program instructions comprising:
   program instructions to receive at least one audio file within a plurality of audio files associated with a term from a first computer via a communications network, wherein the received at least one audio file includes a recording capturing a vocalization of the term spoken by a vocalizing user;
   program instructions to play the received at least one audio file for review by the vocalizing user;
   program instructions to present a confirmation button to the vocalizing user through a graphical user interface in response to playing the received at least one audio file for review, wherein the vocalizing user indicates the received at least one audio file is satisfactory by activating the confirmation button;
   program instructions to receive a vocalizing user satisfaction indicator in response to the vocalizing user activating the confirmation button;
   program instructions to determine if at least one audio quality characteristic of the received at least one audio file exceeds an audio quality threshold in response to receiving the vocalizing user satisfaction indicator;

program instructions to play the received at least one audio file for evaluation by an evaluating user based on determining that the at least one audio quality characteristic of the received at least one audio file for audio exceeds an audio quality threshold;

program instructions to receive, in response to playing the received at least one audio file, at least one user evaluation generated by the evaluating user from a second computer via the communications network associated with the at least one audio file, the at least one user evaluation being based on a correlation between nationality characteristics associated with the received at least one audio file and the at least one user evaluation, wherein the received at least one user evaluation includes at least one of a user evaluation score, at least one linguistic skill of the evaluating user, and a plurality of background information of the evaluating user;

program instructions to assign a ranking to the at least one audio file within the plurality of audio files based on the received at least one user evaluation associated with the at least one audio file, wherein the assigned ranking is from a lowest ranking to a highest ranking, and wherein the assigned ranking is weighted based on at least one of a number of evaluating users, the user evaluation score, the at least one linguistic skill, and the plurality of background information;

program instructions to add the assigned highest ranking audio file into the audio dictionary; and program instructions to train a voice assistance service to recognize an audio input from a user matching the added assigned highest ranking audio file in the audio dictionary.

9. The computer program product of claim 8, wherein the at least one audio file associated with the term includes a first nationality characteristic and the at least one user evaluation includes a second nationality characteristic, the assigned ranking being reduced based on the first and the second nationality characteristic being different.

10. The computer program product of claim 9, wherein the program instructions to receive the at least one user evaluation is based on the first nationality characteristic and the second nationality characteristic, the assigned ranking being increased based on the first and the second nationality characteristic being the same.

11. The computer program product of claim 8, wherein the program instructions to add the assigned highest ranking audio file in the audio dictionary comprises training the audio dictionary to associate an audio input with the added highest ranking audio file.

12. The computer program product of claim 8, wherein the program instructions to add the assigned highest ranking audio file in the audio dictionary comprises training the audio dictionary to associate an audio output with the highest ranking audio file.

\* \* \* \* \*